United States Patent
Mariyani et al.

(10) Patent No.: US 11,689,915 B1
(45) Date of Patent: Jun. 27, 2023

(54) SYSTEM AND METHOD FOR 5G TELECOMMUNICATION CALL EVENT TIMESTAMPING

(71) Applicant: T-Mobile Innovations LLC, Overland Park, KS (US)

(72) Inventors: Anil Kumar Mariyani, Ashburn, VA (US); Rajil Malhotra, Olathe, KS (US); Anuj Sharma, Broadlands, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 128 days.

(21) Appl. No.: 17/195,758

(22) Filed: Mar. 9, 2021

(51) Int. Cl.
    *H04W 8/30*     (2009.01)

(52) U.S. Cl.
    CPC .................................. *H04W 8/30* (2013.01)

(58) Field of Classification Search
    CPC ............... H04W 8/30; H04W 56/00–0095
    See application file for complete search history.

(56) References Cited

U.S. PATENT DOCUMENTS

| | | | |
|---|---|---|---|
| 2013/0185457 A1* | 7/2013 | Campbell | G06F 3/0635 710/5 |
| 2019/0356575 A1* | 11/2019 | Inam | H04W 8/04 |
| 2022/0167124 A1* | 5/2022 | Xu | H04W 8/186 |

OTHER PUBLICATIONS

The Authoritative Dictionary of IEEE Standards Terms, Seventh Edition, Year 2000, ISBN 0-7381-3926-2 SE127 (Year: 2000).*

* cited by examiner

*Primary Examiner* — Ronald Eisner
(74) *Attorney, Agent, or Firm* — Shook, Hardy & Bacon L.L.P.

(57) ABSTRACT

Systems and methods for 5G telecommunication call event timestamping to assist in debugging the flow of call events, such as during roaming, handover operations, or when user equipment (UE) accesses a different network slice. Specifically, a system for the provision of wireless telecommunication services can include a core network having a first UDR and a first UDM. The first UDM, upon receiving communication from one or more network functions, can communicate a first message to the first UDR. The first message can include a first timestamp indicating to the first UDR a first time that the first message was transmitted.

19 Claims, 4 Drawing Sheets

SYSTEM AND METHOD FOR 5G TELECOMMUNICATION CALL EVENT TIMESTAMPING

BACKGROUND

In 5G telecommunication networks, an end-to-end type architecture can include, for example, user equipment (UE), access network, core network, data network, and an application server or some other end point, such as another UE. The UE can be a mobile phone or the like for end-users to communicate with each other. The access network wirelessly connects the UE to the core network. The core network has numerous components providing various services within the network.

In 5G, core access and mobility management function (AMF) and session management function (SMF) generally replace the mobility management entity (MME) and divide functionality at the edge of the core network. The core network also includes the authentication server function (AUSF), unified data management (UDM), unified data repository (UDR), and the short message service function (SMSF). Within the core network, the UDM controls data for access authorization, user registration, and data network profiles. In a stateless embodiment, the UDM manages access authorization, user registration, and data network profiles and obtains actual user/subscriber information from the UDR. Various call events received by the UDM are then used to update or otherwise write to the UDR.

In 5G networks, the AUSF, UDR, and the UDM cooperatively replace the home subscriber service (HSS) used in prior 4G telecommunication networks. However, any errors that occur when data is transmitted between the UDM and the UDR can cause problems for the subscriber or UE in ways that are difficult to debug in current 5G networks.

SUMMARY

The present disclosure is directed, in part, to systems and methods for 5G telecommunication call even timestamping. According to various aspects of the technology, a first aspect of the present disclosure is directed to a system for the provision of wireless telecommunication services. The system can be a core network or the like and can include a first UDR and a first UDM. The first UDM can be configured to communicate a first message to the first UDR. The first message can comprise a first timestamp indicating to the first UDR a first time that the first message was transmitted.

According to another aspect, a method for tracking data exchange among wireless telecommunication services can include receiving, by a first UDM, communication from one or more network functions. Then, the method can include sending, via the first UDM, a first message to the first UDR in response to receiving the communication from at least one of the network functions. The first message can comprise a first timestamp indicating to the first UDR a first time that the first message was transmitted. Furthermore, the method can include writing, via the first UDR, the first message including the first timestamp into the first UDR upon receipt of the first message.

Yet another embodiment includes one or more non-transitory computer-readable media having computer-executable instructions embodied thereon that, when executed on one or more processors of one or more wireless telecommunication services, perform various steps for tracking data exchange among wireless telecommunication services. The steps can include, for example, a UDM receiving communication from at least one network function and then sending a first message to a UDR in response to receiving communication from the network functions. The first message can comprise a first timestamp indicating to the first UDR a first time that the first message was transmitted. The steps can further include writing the first message, including the first timestamp, into the first UDR upon receipt of the first message.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached figures, which are intended to be exemplary and non-limiting, wherein.

DETAILED DESCRIPTION

Figure 1:
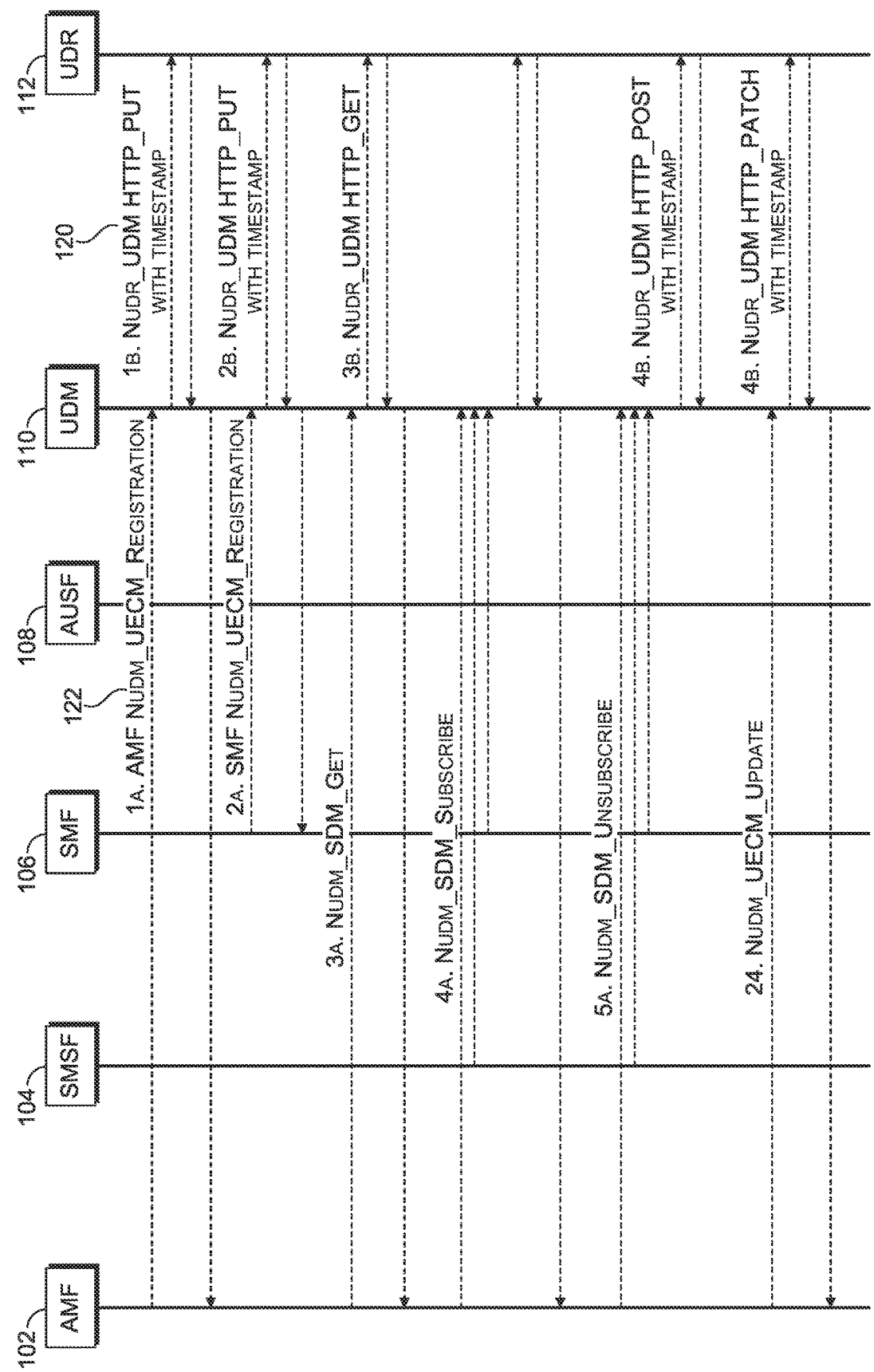
FIG. 1 depicts a diagram of an exemplary core network environment suitable for use in implementations of the present disclosure.

The subject matter of embodiments of the invention is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of this technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices and may be considered transitory, non-transitory, or a combination of both. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, 5G telecommunication networks can utilize an end-to-end type communications architecture that can include, for example, user equipment (UE), access network, core network, data network, and an application server or some other end point, such as another UE. The UE can include, for example, smart phones or other such devices operable to communicate via the 5G telecommunication networks. The access network can wirelessly connect the UE to the core network. The core network has numerous components providing various services within the network.

In 5G telecommunication networks, core access and mobility management function (AMF) and session management function (SMF) generally replace the mobility management entity (MME) and divide functionality at the edge of the core network. The core network also includes the authentication server function (AUSF), unified data management (UDM), unified data repository (UDR), and the short message service function (SMSF).

Within the core network, the UDM controls data for access authorization, user registration, and data network profiles. In a stateless embodiment, as described herein, the UDM manages access authorization, user registration, and data network profiles and obtains user/subscriber information from the UDR. Various call events received by the UDM are then used to update or otherwise write to the UDR. Write commands from the UDM to the UDR can include, for example, a "put" command, a "post" command, and/or a "patch" command. Furthermore, read requests from the UDM to the UDR requesting to read data from the UDR can include, for example, a "get" command.

In 5G networks, the AUSF, UDR, and the UDM cooperatively replace the home subscriber service (HSS) used in prior 4G telecommunication networks. However, any errors that occur when data is transmitted between the UDM and the UDR can cause problems for the subscriber or UE in ways that are difficult to debug in current 5G networks. Specifically, it can be difficult to tell which interface call event created the failures experienced by the subscriber and/or UE. As a solution, the technology described herein adds timestamps accompanying messages sent from the UDM to the UDR. These timestamps makes debugging the flow of call events less cumbersome. For example, the timestamps described herein can advantageously provide the ability to track user behavior across various UDM 'N' interfaces, audit the UDR or database, and debug interworking use-cases such as between 4G/5G handovers.

The present disclosure is generally directed to a system for the provision of wireless telecommunication services. The system can be a core network or the like and can include a first UDR and a first UDM. The first UDM can be configured to communicate a first message to the first UDR in response to receiving communication from one or more network functions. The first message can comprise a first timestamp indicating to the first UDR a first time that the first message was transmitted. This first timestamp can be written to the UDR. In some embodiments, the system can include one or more non-transitory computer-readable media having computer-executable instructions embodied thereon that can, when executed on one or more processors of one or more wireless telecommunication services, perform various steps for tracking data exchange among wireless telecommunication services. Those steps can include, for example, sending the first message from the first UDM to the first UDR upon receiving communication from one of the network functions and then writing the first timestamp of the first message into the first UDR. Other aspects and details of this technology will be described in detail below.

FIG. 1 provides an exemplary call flow of a core network in which implementations of the present disclosure may be employed. Such a core network environment is illustrated and designated generally as core network 100. Core network 100 is but one example of a suitable core network and is not intended to suggest any limitation as to the scope of use or functionality of the invention. Neither should the core network be interpreted as having any dependency or requirement relating to any one or combination of components illustrated.

The core network 100 includes one or more of the following network functions: an AMF 102, a SMSF 104, a SMF 106, and an AUSF 108. Furthermore, the core network 100 includes a UDM 110 and a UDR 112. Furthermore, various interfaces can be provided between the UDM 110 and any of the network functions 102-108, such as various Nudm interfaces. Likewise, interfaces can be provided between the UDM 110 and the UDR 112, such as Nudr interfaces, to allow messages to be sent and received to and from the UDM 110 and the UDR 112. In some alternative embodiments, interfaces between the one or more of the network functions 102-108 directly to the UDR 112 can also be utilized and/or include timestamps in an identical or similar manner to the timestamps described herein.

Figure 5:
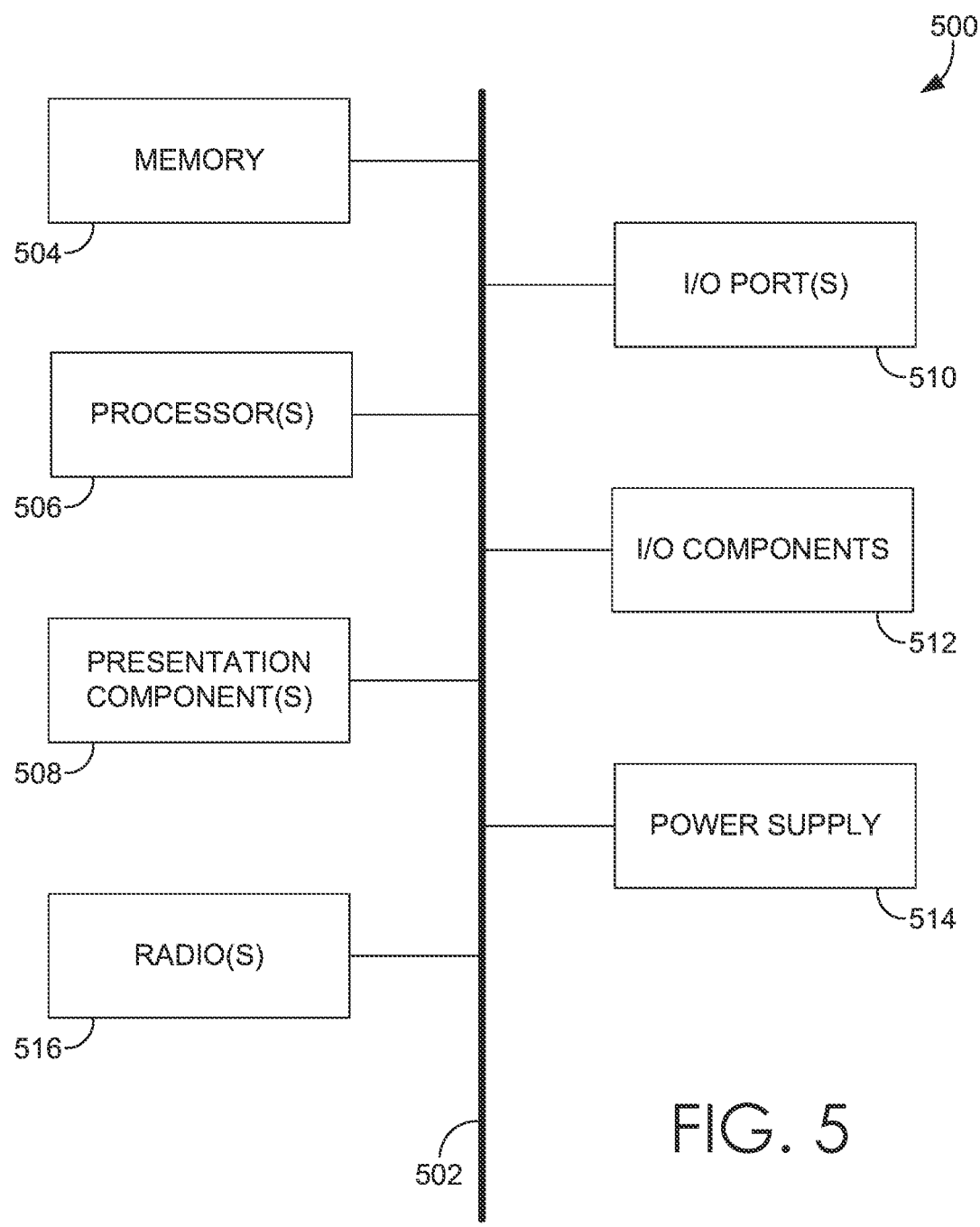
FIG. 5 depicts an exemplary computing environment suitable for use in implementations of the present disclosure.

A system such as the core network 100 can be used for the provision of wireless telecommunication services and can comprise the UDR 112 and the UDM 110, among the other components described herein. In some embodiments, the UDM 110 can comprise one or more processors 506 and the UDR 112 can comprise memory 504, as depicted in FIG. 5 and described below. However, the UDM 110 and the UDR 112 can comprise other computing components and functionality for completing the methods described herein without departing from the scope of the technology herein.

The UDM 110 can be configured to communicate, for example, a message to the UDR 112, with the message comprising a timestamp indicating to the UDR 112 a time that the message was transmitted by the UDM 110. The UDM 110 and the UDR 112 are configured for sending and receiving of messages between each other. The UDM 110 is configured to communicate a first message 120 to the UDR 112 in response to receiving a second message 122 from one of the network functions 102-108. For example, the second message 122 can be any communication the UDM 110 receives from the AMF 102, the SMSF 104, the SMF 106, or the AUSF 108. Upon receipt of the first message 120 from the UDM 110, the UDR 112 is configured to write the first message, including the timestamp, into memory or a database of the UDR 112.

The first message 120 can comprise write commands such as a "put" command, a "post" command, or a "patch" command. In some embodiments, the first message 120 includes commands for the UDM 110 to request to read data from the UDR 112, such as a "get" command. The second message 122 from the network functions 102-108 can be associated with a user equipment (UE) accessing a different network slice, a handover operation of the UE, roaming of the UE in a home network, or roaming of the UE in a domestic or international partner network. In some embodiments, the second message 122 includes or is associated with one of the following call events: register, subscribe, deregister, unsubscribe, update, or notify.

For example, the UDM 110 can write timestamps in universal time clock (UTC) format for various interface call flows, such as N8, N10, N13, and N21, among other call flows. That is, the UDM 110 provides services to the AMF 102, SMF 104, SMSF 106, AUSF 108, and others via a Nudm interface. Different functions connect to the Nudm interface via a dedicated interface. As depicted in FIG. 1, the N8 interface is between the AMF and the UDM, the N10 interface is between the SMF and the UDM, the N13 interface is between the AUSF and the UDM, and the N21 interface is between the SMSF and the UDM. Upon receiving any of these call flows or call events, the UDM 110 can communicate via a Nudr interface with the UDR 112 to update or write data to the UDR 112. For example, the UDM 110 sends a message to the UDR 112, with the message including a timestamp indicating a time at which the UDM 110 transmitted that message to the UDR 112.

Examples of types of Nudm events can include any one or more of the following:
a. Nudm_UECM_Registration
b. Nudm_SDM_Subscribe
c. Nudm_UECM_DeRegistration
d. Nudm_UECM_Update
e. Nudm_UECM_DeregistrationNotification
f. Nudm_UECM_Iwderegistrationnotification
g. Nudm_SDM_Notification
h. Nudm_Sdm_UpdatePDU
i. Nudm_EventExposure_Subscribe
j. Nudm_EventExposure_Notify
k. Nudm_SDM_Unsubscribe
l. Nudm_EventExposure_UnSubscribe The above-listed Nudm events can capture all interface call flows (N8, N10, N13, N21). In some embodiments, the UDM 110 writes timestamps separately for one or more of the following: when the UE is roaming in home network, when the UE is roaming in a partner (Domestic/International) network, when the UE is experiencing a handover operation, and/or when the UE is accessing a different network slice.

Figure 2:
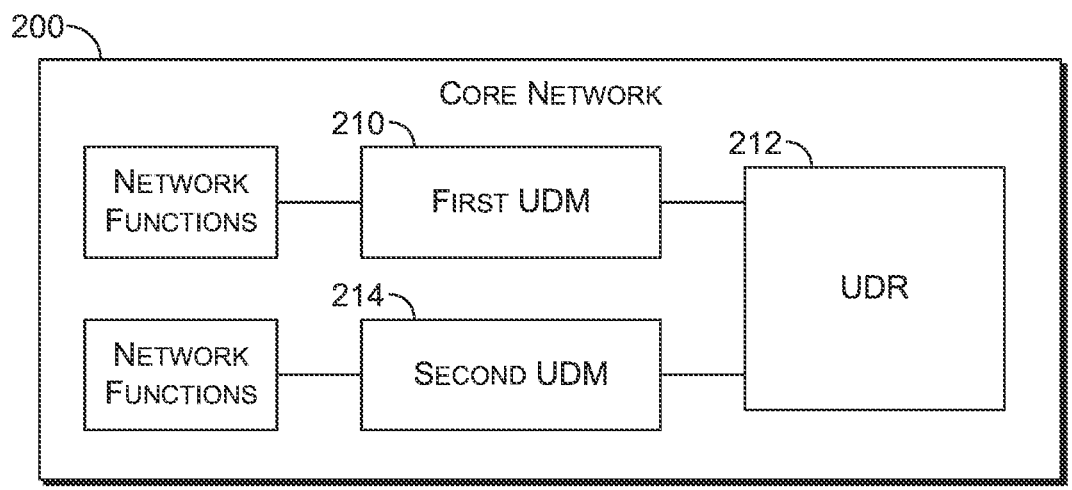
FIG. 2 depicts a diagram of a first UDM of the core network and a first UDR of the core network in communication with a second UDM, in accordance with aspects herein.

As depicted on FIG. 2, another embodiment of a core network 200 includes a first UDM 210, a first UDR 212, and a second UDM 214. The first UDM 210 is configured to communicate a first message to the first UDR 212 and the second UDM 214 is configured to communicate a second message to the first UDR 212. The first message can include a first timestamp indicating to the first UDR 212 a first time that the first message was transmitted. Likewise, the second message can include a second timestamp indicating to the first UDR 212 a second time that the second message was transmitted.

Figure 3:
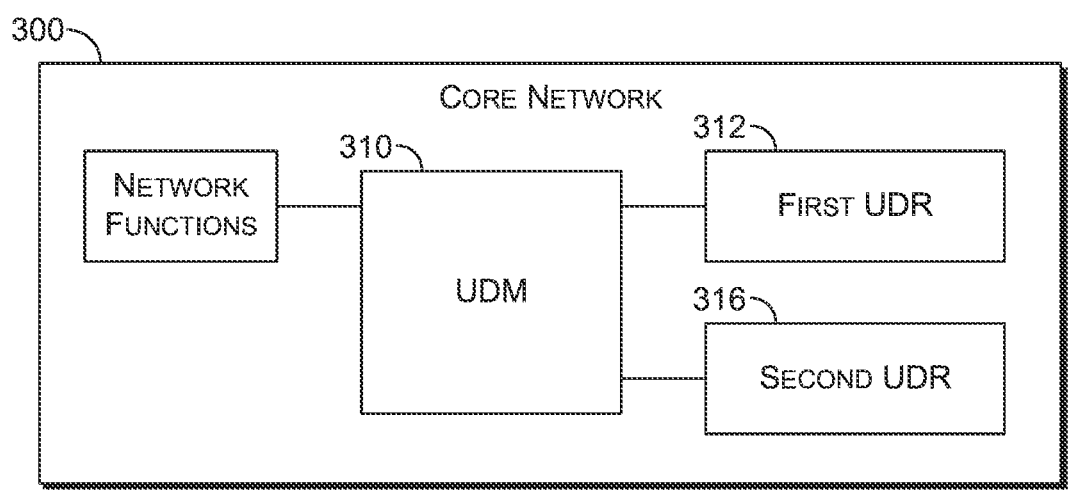
FIG. 3 depicts a diagram of the first UDR of the core network and the first UDM of the core network in communication with a second UDR, in accordance with aspects herein.

As depicted in FIG. 3, another embodiment of a core network 300 includes a first UDM 310, a first UDR 312, and a second UDR 316. The first UDM 310 is configured to communicate a first message to both the first UDR 312 and the second UDR 316. The first message thereby indicates to both the first UDR 312 and the second UDR 316 a first time that the first message was transmitted.

Figure 4:
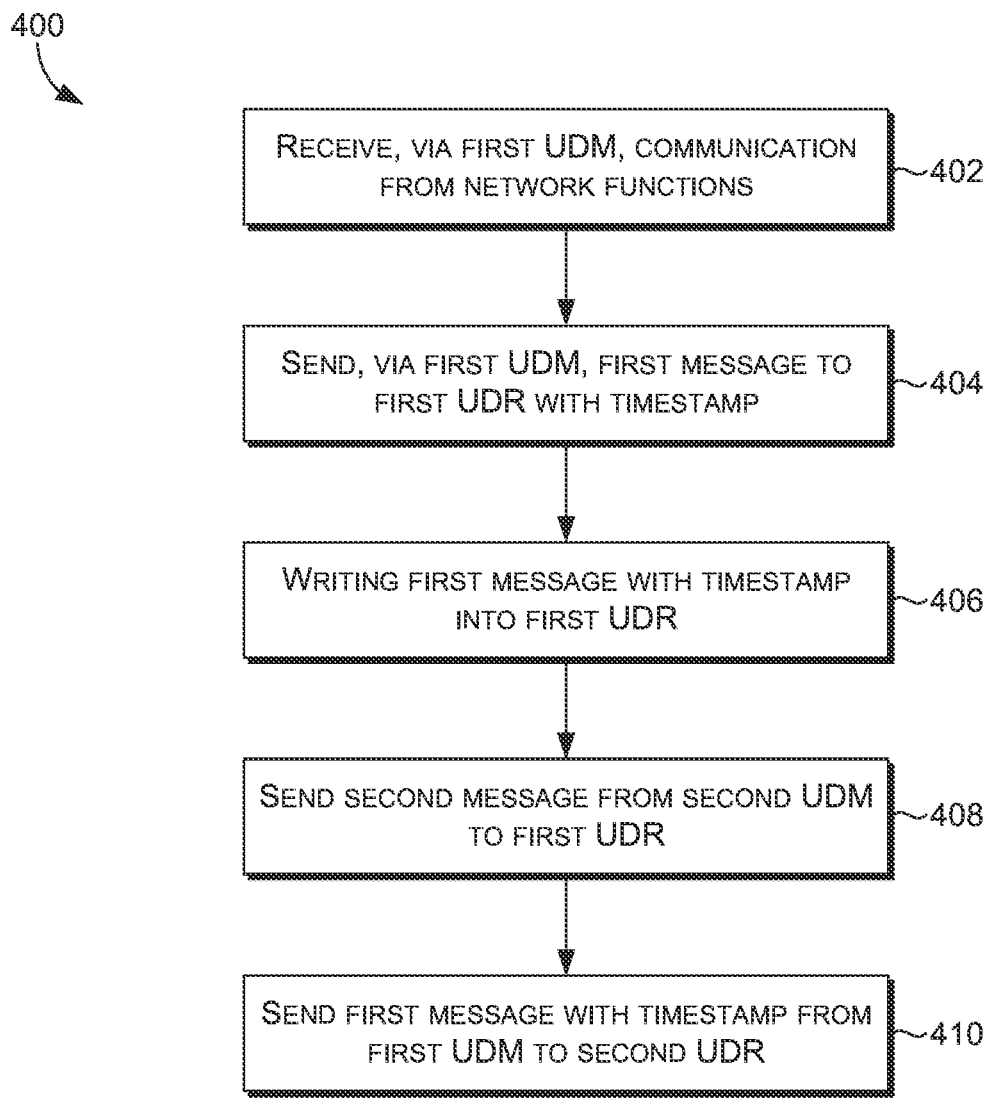
FIG. 4 depicts a flow diagrams of exemplary methods for call event timestamping in accordance with aspects herein.

As depicted in FIG. 4, a method 400 for tracking data exchange among wireless telecommunication services can include a number of steps, which can occur in the order depicted herein or in any other order without departing from the scope of the technology herein. Furthermore, one or more steps can be added, omitted, or duplicated without departing from the scope of the technology described herein. As depicted in block 402, the method 400 can include a first UDM (such as UDM 110) receiving communication from one or more network functions, such as the network functions 102-108 in FIG. 1. Then, as depicted in block 404, the method 400 can include the first UDM sending a first message to a first UDR (such as the UDR 112) in response to receiving the communication from at least one of the network functions 102-108. The first message can include a first timestamp indicating to the first UDR a first time that the first message was transmitted. The method 400, as depicted in block 406, can further include writing, via the first UDR, the first message including the first timestamp into the first UDR upon receipt of the first message.

In some embodiments, the method 400 further comprises sending, via a second UDM, a second message to the first UDR, as depicted in block 408. The second message can comprise a second timestamp indicating to the first UDR a second time that the second message was transmitted. That is, a plurality of UDMs can communicate with the first UDR in some embodiments of the invention. Note that any quantity of messages sent between one or more UDMs and the UDR can be timestamped as described herein without departing from the scope of the technology herein.

Additionally or alternatively, some embodiments of method 400 can include a step of sending, via the first UDM, the first message to a second UDR, as depicted in block 410. That is, more than one UDR can receive the first message and the identical timestamp provided therewith, representing the time the UDM transmitted the first message.

As noted above in regards to the system of FIG. 1, the one or more network functions in method 400 can include at least one of access and mobility management function (AMF), short message service function (SMSF), session management function (SMF), and authentication server function (AUSF). Furthermore, communication from the one or more network functions can be associated with a UE accessing a different network slice, a handover operation of the UE, roaming of the UE in a home network, or roaming of the UE in a partner network. The communication from the one or more network functions in method 400 can additionally or alternatively include one of the following call events: register, subscribe, deregister, unsubscribe, update, or notify. The first message or the second message can include write commands, such as a put command, a post command, or a patch command, as described above. Additionally or alternatively, read commands can be included in the first or second messages, such as a get command or the like.

Referring to FIG. 5, a diagram is depicted of an exemplary computing environment suitable for use in implementations of the present disclosure. In particular, the exemplary computer environment is shown and designated generally as computing device 500. Computing device 500 is but one example of a suitable computing environment and is not intended to suggest any limitation as to the scope of use or functionality of the invention. Neither should computing device 500 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 5, computing device 500 includes bus 502 that directly or indirectly couples the following devices: memory 504, one or more processors 506, one or more presentation components 508, input/output (I/O) ports 510, I/O components 512, and power supply 514. Bus 502 represents what may be one or more busses (such as an address bus, data bus, or combination thereof). Although the devices of FIG. 5 are shown with lines for the sake of clarity, in reality, delineating various components is not so clear, and metaphorically, the lines would more accurately be grey and fuzzy. For example, one may consider a presentation component such as a display device to be one of I/O components 512. Also, processors, such as one or more processors 506, have memory. The present disclosure hereof recognizes that such is the nature of the art, and reiterates that FIG. 5 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 5 and refer to "computer" or "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 504 includes computer-storage media in the form of volatile and/or nonvolatile memory. Memory 504 may be removable, nonremovable, or a combination thereof. Exemplary memory includes solid-state memory, hard drives, optical-disc drives, etc. Computing device 500 includes one or more processors 506 that read data from various entities such as bus 502, memory 504 or I/O components 512. One or more presentation components 508 presents data indications to a person or other device. Exemplary one or more presentation components 508 include a display device, speaker, printing component, vibrating component, etc. I/O ports 510 allow computing device 500 to be logically coupled to other devices including I/O components 512, some of which may be built in computing device 500. Illustrative I/O components 512 include a microphone, joystick, game pad, satellite dish, scanner, printer, wireless device, etc.

Radio 516 represents a radio that facilitates communication with a wireless telecommunications network. Illustrative wireless telecommunications technologies include CDMA, GPRS, TDMA, GSM, and the like. Radio 816 might additionally or alternatively facilitate other types of wireless communications including Wi-Fi, WiMAX, LTE, or other VoIP communications. As can be appreciated, in various embodiments, radio 516 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A system for providing wireless telecommunication services comprising:
   a first unified data repository (UDR) comprising a memory; and
   a first unified data management (UDM) comprising a memory and configured to communicate a first message to the first UDR, the first message comprising a first timestamp indicating to the first UDR a first time that the first message was transmitted,
   wherein the first UDM is configured to send the first message in response to receiving a second message from one or more network functions, and
   wherein the first UDR is configured to write the first message including the first timestamp into the first UDR upon receipt of the first message.

2. The system of claim 1, wherein the first UDM and the first UDR are configured for sending and receiving of messages between the first UDM and the first UDR.

3. The system of claim 1, further comprising a second UDM configured to communicate a second message to the first UDR, the second message comprising a second timestamp indicating to the first UDR a second time that the second message was transmitted.

4. The system of claim 1, wherein the first UDM is further configured to communicate the first message to a second UDR, the first message thereby indicating to the second UDR the first time that the first message was transmitted.

5. The system of claim 1, wherein the one or more network functions include at least one of access and mobility management function (AMF), short message service function (SMSF), session management function (SMF), and authentication server function (AUSF).

6. The system of claim 1, wherein the first message comprises a put command, a post command, or a patch command.

7. The system of claim 1, wherein the first message includes a get command or some other command for the first UDM to request to read data from the first UDR.

8. A method for tracking data exchange among wireless telecommunication services, the method comprising:
   receiving, by a first unified data management (UDM), communication from one or more network functions;
   sending, via the first UDM, a first message to a first unified data repository (UDR) in response to receiving the communication from the one or more network functions, the first message comprising a first timestamp indicating to the first UDR a first time that the first message was transmitted; and
   writing, via the first UDR, the first message including the first timestamp into the first UDR upon receipt of the first message.

9. The method of claim 8, further comprising sending, via a second UDM, a second message to the first UDR, the second message comprising a second timestamp indicating to the first UDR a second time that the second message was transmitted.

10. The method of claim 8, further comprising sending, via the first UDM, the first message to a second UDR.

11. The method of claim 8, wherein the one or more network functions include at least one of access and mobility management function (AMF), short message service function (SMSF), session management function (SMF), and authentication server function (AUSF).

12. The method of claim 8, wherein the communication from the one or more network functions is associated with a user equipment (UE) accessing a different network slice, a handover operation of the UE, roaming of the UE in a home network, or roaming of the UE in a partner network.

13. The method of claim 8, wherein the first message comprises a put command, a post command, or a patch command.

14. The method of claim 8, wherein the communication from the one or more network functions includes one of the following call events: register, subscribe, deregister, unsubscribe, update, or notify.

15. One or more non-transitory computer-readable media having computer-executable instructions embodied thereon that, when executed on one or more processors of one or more wireless telecommunication services, perform the following steps:
   receiving, by a first unified data management (UDM), communication from one or more network functions;
   sending, via the first UDM, a first message to a first unified data repository (UDR) in response to receiving data via the one or more network functions, the first message comprising a first timestamp indicating to the first UDR a first time that the first message was transmitted; and
   writing, via the first UDR, the first message including the first timestamp into the first UDR upon receipt of the first message.

16. The non-transitory computer-readable media of claim 15, further comprising the step of sending, via a second UDM, a second message to the first UDR, the second message comprising a second timestamp indicating to the first UDR a second time that the second message was transmitted.

17. The non-transitory computer-readable media of claim 15, further comprising the step of sending the first message from the first UDM to a second UDR.

18. The non-transitory computer-readable media of claim 15, wherein the one or more network functions include at least one of access and mobility management function (AMF), short message service function (SMSF), session management function (SMF), and authentication server function (AUSF).

19. The non-transitory computer-readable media of claim 15, wherein the first message includes at least one of the following: a put command, a post command, a patch command, or a get command.

* * * * *